United States Patent [19]

Gannis et al.

[11] 4,049,833
[45] Sept. 20, 1977

[54] PROCESS FOR TREATING PARTIALLY DEFATTED NUTS

[75] Inventors: Peter Michael Gannis, Stamford, Conn.; Peter Michael Bosco, Hopewell Junction, N.Y.

[73] Assignee: Standard Brands Incorporated, New York, N.Y.

[21] Appl. No.: 623,168

[22] Filed: Oct. 16, 1975

[51] Int. Cl.$^2$ .............................................. A23L 1/20
[52] U.S. Cl. ...................................... 426/93; 426/309; 426/632; 426/438; 426/804
[58] Field of Search ............... 426/93, 302, 309, 632, 426/633, 305, 438, 804

[56] References Cited

U.S. PATENT DOCUMENTS

| 1,955,734 | 4/1934 | Bizzell | 426/632 |
| 2,166,806 | 7/1939 | Du Puis et al. | 426/633 |
| 2,859,121 | 11/1958 | Avera | 426/93 |
| 3,294,549 | 12/1966 | Vix et al. | 426/632 |
| 3,457,087 | 7/1969 | Renner | 426/632 |
| 3,740,236 | 6/1973 | Baxley | 426/93 |

Primary Examiner—Jeanette M. Hunter

[57] ABSTRACT

Partially defatted nuts are contacted with a glycerol-containing solution until at least a portion of the solution is absorbed by the nuts and the nuts have regained substantially their original size and shape. The nuts are then removed from contact with the solution and roasted to provide partially defatted nuts having improved flavor, texture and storage stability.

9 Claims, No Drawings

PROCESS FOR TREATING PARTIALLY DEFATTED NUTS

THE INVENTION

This invention relates to a process for treating partially defatted nuts. More particularly, this invention relates to a process for treating partially defatted nuts so as to improve their flavor, texture and storage stability.

The term "nuts" as used herein includes whole nuts and pieces of nuts such as peanuts, walnuts, filberts, pecans, almonds, Brazil nuts and the like.

In recent years, the public has become extremely weight conscious. It is generally agreed that, for reasons of health and personal appearance, excess body weight is undesirable. As a result of this, the number of available food products providing fewer calories than their conventional counterparts has grown at a rapid pace. These products may be derived from popular and nutritious foods which have a naturally high fat content by removing at least a portion of the fat therefrom. Exemplary of such foods are nuts wherein fat may represent as much as 50 to 70 percent of the total weight and provide an even greater proportion of the total calories. To gain acceptance as components of weight control programs, products having reduced calorie contents must, to a marked degree, simulate the organoleptic characteristics of the same or similar foods whose natural composition has not been altered. In many instances, however, foods from which a significant proportion of the fat has been removed have not achieved this goal.

A number of methods have been disclosed for producing partially defatted nuts. Exemplary of such methods are those disclosed in U.S. Pat. No. 2,003,415 to Ammann, U.S. Pat. No. 3,294,549 to Vix et al., and the articles by Vix et al. entitled "Development and Potential of Partially Defatted Peanuts," *Peanut Journal and Nut World,* January and February, 1967, and the article by the same authors entitled "Low-Calorie Peanuts", *Food Processing/Marketing,* September, 1965. In general, these methods include the steps of pressing raw or blanched nuts until a quantity of oil is removed therefrom and then steaming or cooking the partially defatted nuts in water or in water containing a flavoring agent until the nuts are reconstituted to substantially their original size and shape. The reconstituted nuts may be further processed, e.g., they may be heated in oil, dry roasted, etc. U.S. Pat. No. 3,645,752 to Baxley discloses a process wherein partially defatted nuts are heated in an oil bath to reconstitute the nuts to their original size and shape and then the nuts are heated in a second oil bath containing a flavoring of a different nut type. U.S. Pat. No. 3,740,236, also to Baxley, relates to a process for treating partially defatted nuts by reconstituting the same in an aqueous coating solution comprised of water and dextrin. The water is absorbed into the nuts while the surface of the nuts is coated by the dextrin which serves as a binder to improve the shelf-life of the nuts and prepares the nut surface for application of dry coatings of powdered flavorings and the like.

Processes for treating nuts and nut-like products with polyhydric alcohols, including glycerol, and with esters of glycerol, are also well known in the art. U.S. Pat. No. 1,955,734 to Bizzel et al. discloses a process for preserving the flavor and moisture content of Brazil nuts by applying an aqueous solution of glycerol to the surface of the nuts. U.S. Pat. No. 2,631,938 to Miers et al. is directed to a process for coating nuts with a film comprising a pectinate or pectate and other materials including glycerol. U.S. Pat. No. 2,742,364 to Neumann relates to a process for applying a molten bonding agent, e.g., glycerol monostearate, and a higher fatty acid to the surface of nut meats and solidifying the bonding agent. U.S. Pat. Nos. 2,859,121 and 2,860,053, both to Avera, are directed, respectively, to a process for rendering nuts resistant to the development of undesirable flavors and odors by heating the nuts in molten sorbitol and to a roasted nut product having a coating of sorbitol thereon. U.S. Pat. No. 2,952,544 to Durst et al. discloses a synthetic, nut-like product and process for making the same. In this process, a slurry is prepared containing an edible film-forming material and an edible water-immiscible liquid and the slurry is slowly dried. Glycerol may be incorporated into the product as a stabilizer and to assist in providing a dried material which simulates peanuts when the dried material is roasted. U.S. Pat. No. 3,457,087 to Renner is directed to a method for processing peanuts to eliminate surface blemishes when the peanuts are heated. This is accomplished by quenching heated nuts in a non-evaporating liquid, for example, vegetable oil or animal fat. Certain additives may be present along with these liquids such as anti-oxidants, flavoring compounds and water soluble organic humectants including glycerol, sorbitol, propylene glycol and the like which affect the crispness, hardness and chewability of the resulting peanuts. U.S. Pat. No. 3,477,858 to Wells et al. discloses a process for coating nuts with a molten solution of mannitol and sorbitol to provide an improved dry roasted product. U.S. Pat. No. 3,552,979 to Kruse relates to a process for coating and roasting nuts wherein nut meats are treated with a molten sorbitol-rich blend of sorbitol and mannitol prior to dry roasting the nut meats. U.S. Pat. No. 3,671,266 to Cooper et al. is directed to a process for coating nuts with hexitol.

The use of glycerol and esters of glycerol in comminuted nut products, e.g., peanut butter, has also been disclosed. U.S. Pat. No. 2,166,806 to Du Puis et al, is directed to a process for incorporating glycerol into a peanut butter product to reduce the normal tendency of oil to separate from peanut butter. U.S. Pat. No. 3,245,803 to Baker et al. relates to the preparation of a peanut butter stabilizer comprising an aqueous solution of a polyhydric alcohol, which may be glycerol, a hydrophilic colloid, an emulsifier and glycerides. U.S. Pat. No. 3,749,587 To Billerbeck et al, discloses a sweetened storage stable peanut butter spread wherein glycerol may be used as an anticrystallization agent. Canadian Pat. No. 817,862 is directed to shaped nutmeat-containing foodstuffs and to a process for preparing the same wherein glycerol esters may be added to nut solids or presscake to assist in forming the products into discrete shapes.

Currently available partially defatted nut products have not been widely accepted by the public. For the most part, such products do not have a desirable texture, and, to a significant extent, lack the flavor and storage stability of the original nuts. When chewed, such products feel gritty or chalky in the mouth and produce an unsatisfactory mouth feel.

Partially defatted nuts are commonly dry roasted, i.e., they are heated in a dry environment as opposed to oil roasting processes wherein the nuts are heated in contact with an edible oil. While dry roasting processes provide a number of advantages, one difficulty which is usually encountered during dry roasting of partially defatted nuts is the seepage of oil from the interior of the nuts. The oil coats the surface of the nuts and may be of a sufficient quantity to drip off the nuts causing processing problems and oil residues on the surfaces of processing equipment. To remove the oil from such equipment requires expensive cleaning procedures which add to the cost of the products.

Accordingly, it is a principal object of the present invention to provide a process for treating partially defatted nuts to improve their flavor and texture.

It is another object of the present invention to provide a process for treating partially defatted nuts to improve their storage stability.

It is still another object of the present invention to provide a process for treating partially defatted nuts which may be dry roasted without substantial seepage of oil from the interior of the nuts occurring.

It is a further object of the present invention to provide partially defatted nuts having substantially the flavor and texture of the original nuts.

These objects and other objects of the present invention, which will be apparent from the following description, may be attained in accordance with the present invention by contacting mechanically defatted nuts with a glycerol-containing solution under conditions whereby at least a portion of said solution is absorbed by the defatted nuts and the nuts are reconstituted to substantially their original size and shape, and roasting said nuts to obtain a nut product having a flavor and texture essentially the same as roasted nuts which have not been defatted.

The preferred amount of glycerol absorbed by the defatted nuts will be in the range of from about 2 to about 9 percent based on the weight of partially defatted nuts from which about 40 to about 50 percent of oil has been removed. When very low levels of glycerol are absorbed, little or no improvement in flavor and texture is observed. On the other hand, at exceedingly high levels of absorption, no further improvement is imparted and such levels are not recommended for economic reasons.

The above range of glycerol absorption may vary somewhat, depending upon the amount of oil extracted from the nuts since, the greater the amount of oil extracted, the more pronounced is the effect on the original organoleptic characteristics of the nuts. Thus, in the present invention, the greater the amount of oil removed from the nuts, the higher will be the amount of absorbed glycerol desired in the nuts to impart substantially the original organoleptic characteristics thereto.

The partially defatted nuts may be contacted with the glycerol solution in any convenient manner so long as the requisite amount of glycerol is absorbed, e.g., they may be steeped in the solution or the nuts may be placed in a rotating drum and the solution added at a rate sufficient to maintain the solution in continuous contact with the nuts. The process of the present invention may be carried out in a batch or continuous manner.

The conditions under which the defatted nuts may be treated with a glycerol-containing solution may vary widely depending upon the desired end product and the type of nut being treated. The concentration of glycerol in the solution, the period during which the nuts are contacted with the solution and the temperature at which the nuts are contacted with the solution are interdependent variables. Typically, the partially defatted nuts may be reconstituted by heating the nuts in contact with an aqueous solution containing at least about 2 percent glycerol for a period of a least about 2 minutes at a temperature of at least about 150° F. It is preferred that the partially defatted nuts be heated while in contact with an aqueous solution having a glycerol content of about 17 percent for a period of about 2½ to 3 minutes at a temperature of about 200° F.

Reconstituting the partially defatted nuts while in contact with the glycerol solution at elevated temperatures provides the advantages that the nuts can be reconstituted in a shorter period as compared to the reconstitution being carried out at lower temperatures and that, generally, larger amounts of glycerol can be absorbed by the nuts.

Glycerol appears unique in its ability to impart improved texture and other organoleptic properties to defatted nuts. Other polyhydric alcohols were tried such as sorbitol, mannitol, propylene glycol, maltitol and xylitol and did not impart the sought after organoleptic properties to the desired degree.

While we do not wish to be bound by any theory or reason why glycerol imparts desired properties to defatted nuts, it is believed that the glycerol is absorbed and concentrated largely in the oil spaces beneath the surface of the nuts. Apparently, the exudation of oil from more interior portions of the nuts is thus prevented. The absorbed glycerol may act as a solvent for the flavoring components in the nuts and thereby prevent their volatilization when the treated nuts are subsequently roasted.

A variety of materials and coatings comprising gums, spices, sugar, flavorings, colorants and the like may be applied to the surface of the nuts either before or after the final heating steps. Also, such materials may be incorporated into the glycerol solution.

In order to more clearly describe the nature of the present invention, specific examples will hereinafter be described. It should be understood, however, that this is done solely by way of example and is intended neither to delineate the scope of the invention nor limit the ambit of the appended claims.

EXAMPLE I

This Example illustrates the process for treating partially defatted nuts with a glycerol-containing solution to improve the flavor and texture of the nuts.

Blanched Virginia peanuts having an oil content of from about 48 to 50 percent were pressed in a hydraulic press at a pressure of 2000 psi. until about 50 percent of the oil was removed from the nuts. 600 g of the raw partially defatted peanuts were steeped in an aqueous solution having a glycerol content of 17 percent at a temperature of 200° F. for a period of 3 minutes. The peanuts were then removed from contact with the solution and allowed to drain for several minutes following which the peanuts were dry roasted at a temperature of about 295° F. until the moisture content of the peanuts was about 2 percent and then coated with salt. The treated peanuts were found to have a total glycerol content of 5.2 percent. Little or no oil appeared on the surface of the peanuts and no oil accumulated on the surfaces of the processing equipment during roasting.

An expert taste panel compared these peanuts for flavor and texture with untreated partially defatted peanuts which had been reconstituted in water, dry roasted and coated with salt and monosodium glutamate. The consensus of the panel was that the glycerol treated peanuts had substantially better flavor than the untreated peanuts and had a satisfactory texture.

EXAMPLE II

This Example illustrates the effect of glycerol treatment on the stability of oil roasted defatted nuts and on their flavor and texture.

One part by weight of defatted peanuts (defatted by the procedure of Example I) was added to two parts of an aqueous solution containing 17 percent glycerol at a temperature of 195° F. After 2.5 minutes, the nuts were removed from the solution, coated with salt and monosodium glutamate and oil roasted at a temperature of about 320° F. for a period of 10 minutes. A control sample of defatted peanuts which had been reconstituted in water was prepared in the same manner. The control sample and the glycerol treated sample were submitted for evaluation of flavor and texture to a taste panel of 30 members. Twenty-one members of the panel preferred the glycerol treated defatted nuts, eight members preferred the control and one indicated no preference.

An accelerated storage test was carried out on the glycerol treated peanuts and on the control sample by placing the nuts in a forced air oven maintained at a temperature of 145° F. After 4 days, the control sample was determined to be rancid whereas the glycerol treated peanuts showed evidence of rancidity after 10 days of accelerated storage.

EXAMPLE III

This Example illustrates the effect of contact time of the glycerol solution with raw partially defatted peanuts on the amount of solution absorbed and on the texture and flavor of the treated peanuts.

100 grams of defatted peanuts (defatted by the procedure of Example I) was added to 200 grams of a 17 percent glycerol solution at a temperature of about 193° F. After various periods, the nuts were removed from the solution, oil roasted, coated with salt and monosodium glutamate and evaluated for texture and flavor. The results are set forth in Table I below:

TABLE I

Effect of Contact Time on Flavor, Texture and Glycerol Absorption

| Contact Time (Min.) | Weight of Contacted Nuts | % Solution Absorbed | Texture | Flavor |
|---|---|---|---|---|
| 2 (control) | 130* | 23.0 | Soft | Bland |
| 2 | 130 | 23.0 | ↓ | Peanut Flavor |
| 3 | 135 | 25.9 | ↓ | ↓ |
| 4 | 137 | 27.0 | ↓ | ↓ |
| 5 | 143 | 30.0 | ↓ | ↓ |
| 7 | 145 | 31.0 | ↓ | ↓ |
| 10 | 153 | 34.6 | Hardest | Strongest |

TABLE I-continued

Effect of Contact Time on Flavor, Texture and Glycerol Absorption

| Contact Time (Min.) | Weight of Contacted Nuts | % Solution Absorbed | Texture | Flavor |
|---|---|---|---|---|
| | | | | Peanut Flavor |

*No glycerol treatment.

As the contact time increased, greater amounts of glycerol were absorbed into the defatted nuts. This resulted in increased flavor development of the defatted nuts. However, as the period of contact was increased, texture of the nuts became harder than was desired.

The terms and expressions which have been employed are used as terms of description and not of limitation. It is not intended, in the use of such terms and expressions, to exclude any equivalents of the features shown and described or portions thereof, since it is recognized that various modifications are possible within the scope of the invention claimed.

What is claimed is:

1. A process for treating partially defatted nuts comprising contacting the nuts with an aqueous solution containing at least about 2 percent glycerol at a temperature of at least about 150° F for a period of at least about 2 minutes so that at least a portion of said solution is absorbed by the nuts and the nuts are thereby reconstituted, removing the nuts from contact with the solution and roasting the nuts, whereby the resulting nuts have substantially the flavor and texture of roasted nuts which have not been defatted.

2. A process for treating partially defatted nuts as defined in claim 1, wherein the nuts are contacted with an aqueous solution containing about 17 percent glycerol at a temperature of about 200° F. for a period of about 3 minutes.

3. A process for treating partially defatted nuts as defined in claim 1, wherein the amount of glycerol absorbed by the nuts is in the range of from about 2 to about 9 percent, based on the weight of nuts from which about 40 to about 50 percent of the oil has been removed.

4. A process for treating partially defatted nuts as defined in claim 1, wherein the glycerol treated nuts are dry roasted.

5. A process for treating partially defatted nuts as defined in claim 1, wherein the glycerol treated nuts are roasted in oil.

6. A process for treating partially defatted nuts as defined in claim 1, wherein the nuts are partially defatted peanuts.

7. A partially defatted roasted nut product having improved flavor and texture having glycerol absorbed therein.

8. A partially defatted roasted nut product produced according to the process of claim 1.

9. A partially defatted roasted nut product as defined in claim 8, wherein the partially defatted nuts have absorbed therein at least about 2 percent glycerol.

* * * * *